Dec. 19, 1967  J. A. HAEBER  3,358,753
UNDERWATER FLOWLINE INSTALLATION
Filed Dec. 30, 1965  9 Sheets-Sheet 1

INVENTOR:
JOHN A. HAEBER
BY: J. H. McCarthy
HIS AGENT

Dec. 19, 1967 J. A. HAEBER 3,358,753
UNDERWATER FLOWLINE INSTALLATION
Filed Dec. 30, 1965 9 Sheets-Sheet 2

INVENTOR:
JOHN A. HAEBER
BY: A. H. McCarthy
HIS AGENT

INVENTOR:
JOHN A. HAEBER
BY: J. H. McCarthy
HIS AGENT

Dec. 19, 1967  J. A. HAEBER  3,358,753
UNDERWATER FLOWLINE INSTALLATION
Filed Dec. 30, 1965  9 Sheets-Sheet 6

FIG. 14

INVENTOR:
JOHN A. HAEBER
BY: J. H. McCarthy
HIS AGENT

Dec. 19, 1967  J. A. HAEBER  3,358,753
UNDERWATER FLOWLINE INSTALLATION
Filed Dec. 30, 1965  9 Sheets-Sheet 7

INVENTOR:
JOHN A. HAEBER
BY: A. H. McCarthy
HIS AGENT

FIG. 16

FIG. 17 developed for drilling and completing oil and gas wells in the ocean floor in a manner such that after completion of the well the wellhead assembly is positioned beneath the surface of the ocean, preferably on the floor thereof. In practice, these wellhead assemblies are often positioned in depths of water greater than the depth at which a diver can safely and readily work. Thus, the coupling of flow conduits to such wellhead assemblies presents a new and difficult operation which is not readily carried out by presently available well-working equipment.

United States Patent Office 3,358,753
Patented Dec. 19, 1967

3,358,753
UNDERWATER FLOWLINE INSTALLATION
John A. Haeber, Ventura, Calif., assignor to Shell Oil Company, New York, N.Y., a corporation of Delaware
Filed Dec. 30, 1965, Ser. No. 517,595
21 Claims. (Cl. 166—.6)

The present invention relates to oil well equipment for use at underwater locations and pertains more particularly to a method and apparatus for remotely coupling a flowline or conduit to an installation submerged within a body of water. The equipment includes both the coupling mechanism to establish communication between the installation and the conduit and the coupling-facilitating apparatus to be used in combination with the coupling mechanism.

For many years offshore wells have been drilled either from stationary platforms anchored to the ocean floor, movable barges temporarily positioned on the ocean floor, or movable barges floating on the body of water in which drilling operations are being conducted. Regardless of the manner in which the wells are drilled, most wells have been completed in a manner such that the outermost tubular member of the well extends upwardly from the ocean floor to a point above the surface of the body of water where a wellhead assembly or Christmas tree is mounted for controlling the production of the well.

Wellheads extending above the surface of a body of water have the disadvantage that they constitute a hazard to navigation in the vicinity of the well. In addition, when such wellheads are positioned in salt water, such as found in the ocean, the structure extending above the water is subject to the corrosive action of salt water and air. Positioning the wellhead and/or casinghead above the surface of the body of water has the advantage, however, that the flow handling and controlling components of the wellhead may be readily secured thereto and adjusted by an operator working from a platform adjacent to the wellhead structure.

Recently, methods and apparatus have been developed for drilling and completing oil and gas wells in the ocean floor in a manner such that after completion of the well the wellhead assembly is positioned beneath the surface of the ocean, preferably on the floor thereof. In practice, these wellhead assemblies are often positioned in depths of water greater than the depth at which a diver can safely and readily work. Thus, the coupling of flow conduits to such wellhead assemblies presents a new and difficult operation which is not readily carried out by presently available well-working equipment.

The problem of securing flowlines to installations submerged in very deep bodies of water is particularly acute because of the high ambient pressures involved and the difficulty of handling long lengths of pipe remotely. This problem is accompanied by the natural problems that are encountered when lowering flowlines to the bottom of relatively deep bodies of water. The high ambient pressure generally makes the use of flexible connection facilitating conduits impractical, since such conduits are very expensive and relatively rigid when fabricated to withstand the high pressures encountered. The use of flexible conduits is also often objectionable, since such conduits do not generally facilitate the passage of pumpable through-the-flowline tools therethrough. The latter characteristic is particularly detrimental, since pumpable through-the-flowline tools provide one of the most practical solutions to the workover problems encountered in submerged wells. Long lengths of pipe are difficult to handle when submerged deeply in a body of water both because of the mass of pipe involved and the remoteness of the handling operation. It is noted that it is particularly difficult to lower long lengths of pipe directly into communication with a deeply submerged underwater installation because the exact length of pipe required to reach the installation is impossible, as a practical matter, to determine.

Since it is necessary from time to time to go back into a well wherever it has been completed for servicing or work-over operations, it is desirable to have an underwater wellhead and/or production structure of suitable design so that it can be readily removed from its underwater position and raised to the surface.

On removing a wellhead assembly from the top of the well in accordance with presently known practice, a diver must first be sent to the ocean floor to disconnect the production flowline from the wellhead assembly. Otherwise, the production flowline adjacent the wellhead assembly must be raised to the surface of the water along with the wellhead assembly when the latter is removed from an underwater wellhead and raised to the surface. Divers can be used effectively only at relatively shallow water depths of up to a few hundred feet.

It is, accordingly, an object of this invention to provide a method and apparatus for installing a flowline at an underwater installation without the use of a long flexible length of flowline.

It is also an object of this invention to provide a method and apparatus for installing a substantially rigid flowline at an underwater installation without using an excessive length of flowline as is required in certain prior art methods wherein the flowline is lowered into engagement with the installation from a surface location substantially directly over said installation.

A further object of the present invention is to provide a method and apparatus for connecting a substantially rigid flowline to an underwater installation without plastically deforming said flowline.

A still further object of the present invention is to provide an underwater wellhead and/or production assembly with a remotely detachable flowline extending therefrom in a manner such that after disconnecting the flowline from the wellhead assembly, either the wellhead assembly or the disconnected flowline may be raised independently to the surface of the water without interfering with the other equipment at the wellhead and without the necessity of moving both the flowline and the wellhead assembly.

These and other objects of the invention will be more fully understood from the following detailed description when taken in conjunction with the accompanying drawings wherein.

Figure 1:
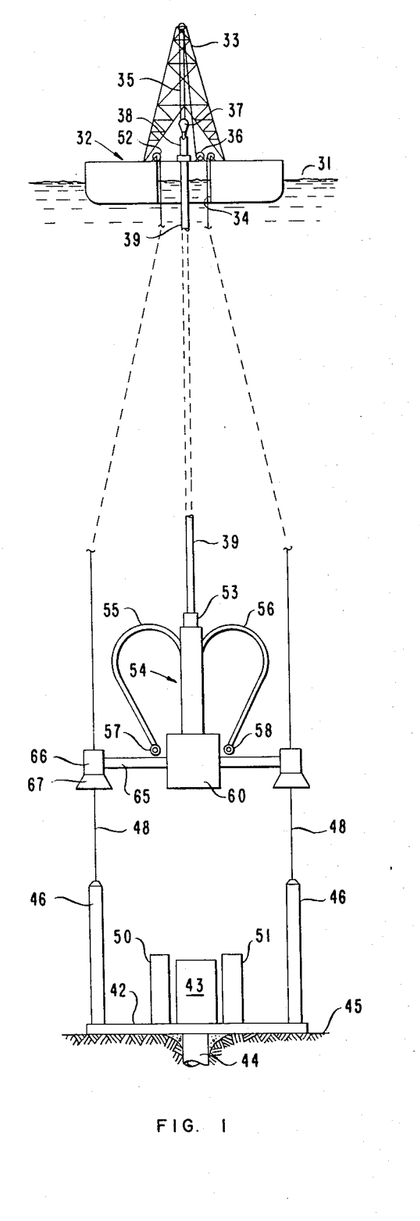
FIGURE 1 is a diagrammatic view illustrating an underwater installation and a production package, adapted for use with the present invention in the process of being installed thereon.

Referring to FIGURE 1 of the drawing, there is illustrated an exemplary application of the invention in use in a body of water 31. In order to facilitate the application of the invention, an operating station taking the form of a floating barge 32 is illustrated as floating on the surface of the water 31 in a position approximately above a preselected underwater installation. The barge 32 may be of known construction and includes a suitable derrick 33 having a well 34 thereunder communicating with the body of water 31. The derrick 33 is equipped with fall lines 35 and a hoist 36 for operating a traveling block 37 to which are secured elevators 38 or other suitable means for suspending a running string 39 during underwater completion or workover operations.

Figure 2:
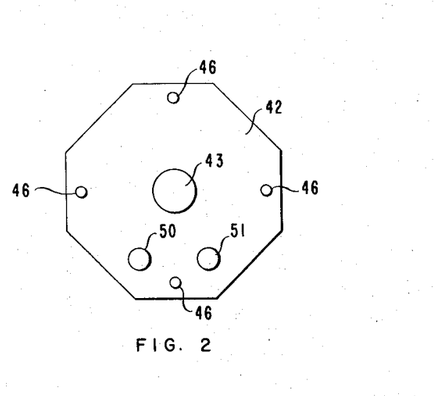
FIGURE 2 is a simplified plan view illustrating the underwater installation shown in the lowermost portion of FIGURE 1.

As shown in both FIGURES 1 and 2, a wellhead support structure, which is represented by a horizontally extending support base 42, having a well casinghead 43 secured thereto and centrally positioned therein, is illustrated as being anchored to the ocean floor by means of a conductor pipe or surface casing 44 which is installed and preferably cemented in the ocean floor 45. As will be more fully understood, infra, the casinghead 43 is adapted to removably receive a connector carried on the lower end of a production package. Secured to the support base 42 are a plurality (preferably four) of guide columns 46 having guide cables 48 extending vertically therefrom to the floating barge 32 where they are preferably secured to the barge by means of constant-tension winches 52. The guide cables 48 are provided for the purpose of guiding pieces of equipment from the barge 32 into alignment onto or adjacent the casinghead 43 positioned on the ocean floor 45.

Also secured to the support base 42 are a pair of landing columns 50 and 51, each adapted to removably receive an ocean-floor flowline pulling and alignment package for use in connecting such flowlines to a production package situated on the support base. For reasons that will be more clearly understood infra, the landing columns 50 and 51 are preferably arranged on opposite sides of the casinghead 43 and parallel to a line normal to the axis of said casinghead (see FIGURE 2).

In the lower portion of FIGURE 1, the running string 39 is shown removably secured to a nipple or mandrel 53 formed at the top of a production package generally denoted at 54. As illustrated, the production package 54 is provided on opposite sides with flowline portions 55 and 56 which emanate near the top of the production package and gently curve outwardly and downwardly, finally terminating in matable end portions 57 and 58 which lie in a horizontal plane (see FIGURE 5). The production package 54 is provided on its lowermost end with a connector 60 which is adapted to be removably secured to the casinghead 43 in a conventional manner.

Secured to the connector portion 60 of the production package 54 is a guide frame 65 which is provided with guide tubes 66 which slide upon the guide cables 48. Preferably, each of the guide tubes 66 has a cone-shaped, downwardly-flared flange 67 attached or integrally formed on its lower end which serves to accurately align the guide tubes 66 as they move downwardly onto the guide posts 46. After the production package 54 has been lowered from the barge 32 and secured upon the casinghead 43 (see FIGURE 3), the running string 39 may be retrieved if desirable.

The underwater installation including the casinghead apparatus and the production package 54 is now ready to produce fluids from beneath the water floor 45, which fluids will leave the installation via either or both of the installation flowlines 55 and 56. However, before the well may be put on production it is necessary to perform the operation of connecting an ocean-floor flowline(s) to the matable ends 57 and/or 58 of the installation flowlines 55 and 56. As pointed out supra, such an operation has proven to be extremely difficult in water depths exceeding those at which a diver can safely operate. Moreover, it is extremely desirable that the connection between the ocean-floor flowline and the underwater installation be made in a manner, (1) such that workover operations may be carried out on the one without interference or disconnection from the other, and (2) such that either may be independently recovered at the water surface.

The method and apparatus by which the present invention successfully achieves the aforementioned objectives will first be briefly described with reference to FIGURES 3–10 and later expanded upon in detail with reference to the remaining figures.

Figures 3, 4, 5, 13:
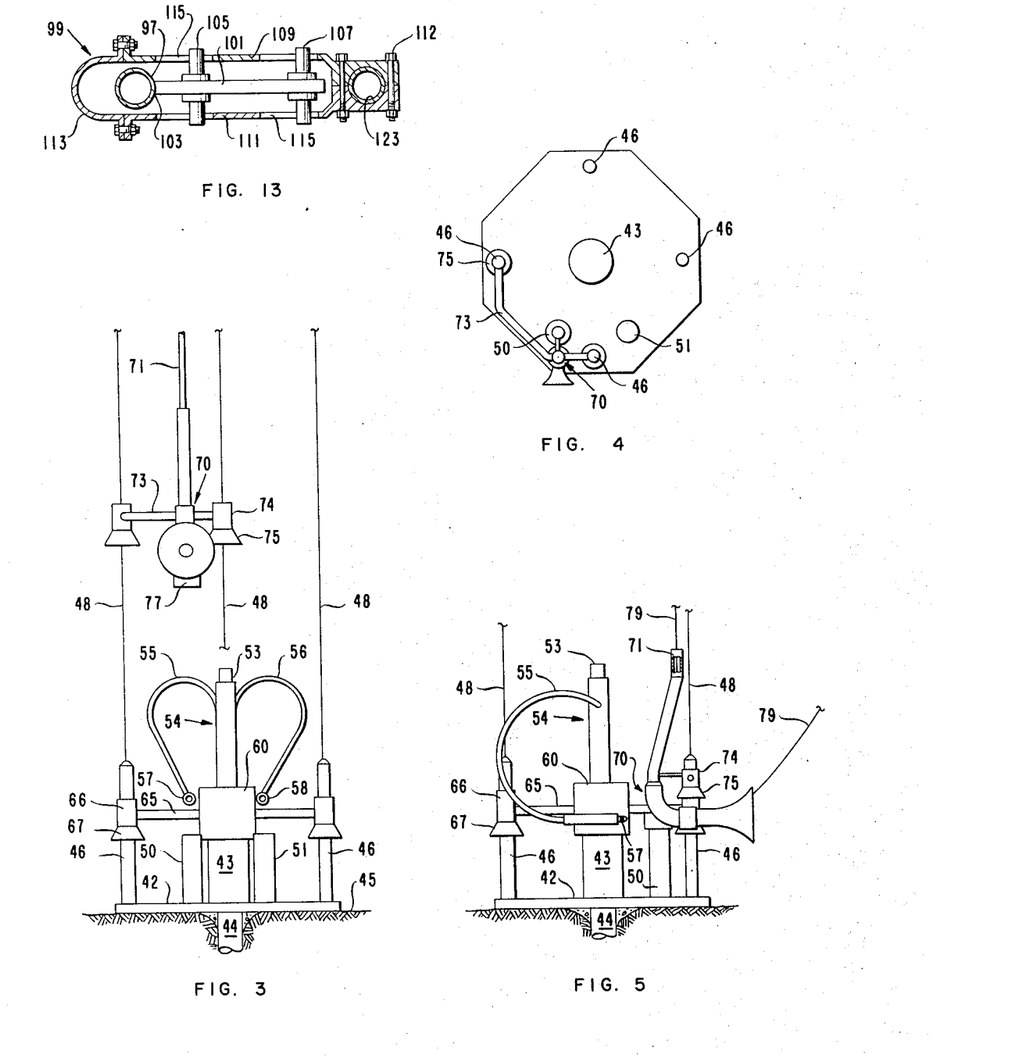
FIGURE 3 is a simplified schematic view illustrating the production package of FIGURE 1 after it has landed on the underwater installation, and further illustrating a combination flowline pulling and alignment package in the process of being lowered to the installation.
FIGURE 4 is a simplified plan view illustrating the combination flowline pulling and alignment package and the guide frame therefor.
FIGURE 5 is a simplified side elevation illustrating both the production package and the combined flowline pulling and alignment package in landed position on the underwater installation and in operative relation to each other.
FIGURE 13 is a cross-sectional view taken along the line 13—13 of FIGURE 11.

Referring to FIGURE 3, there is shown a combination ocean-floor flowline pulling and alignment package 70 constructed in a manner such that an ocean-floor flowline may be pulled into spaced axial alignment with either or both the matable ends 57 and 58 of the installation flowline(s) 55 and 56 and subsequently connected thereto. It is to be understood that if both installation flowlines 55 and 56 are to be connected to ocean-floor flowlines it will be necessary to land two such packages 70; one being received on the landing column 50 and the other on the landing column 51. However, in order to simplify the description of the method and apparatus, reference will only be made to an operation wherein an ocean-floor flowline is installed on the left-hand side of the installation, i.e., connecting or installing an ocean-floor flowline in fluidtight relation with the matable end 57 of the installation flowline 55.

Still referring to FIGURE 3, it is noted that the combination pulling and alignment package 70 is being lowered toward the underwater installation landing column 53 via a running string 71 suspended from the barge 32 in a manner previously described with reference to the running string 39 of FIGURE 1. The combination package 70 is removably attached to a guide frame 73 (see FIGURE 4) which frame is provided with guide tubes 74 (preferably two) which slide upon the guide cables 48. Preferably, each of the guide tubes 74 has a cone-shaped, downwardly-flared flange 75 attached or integrally formed on its lower end which serves to accurately align the guide tubes 74 as they move downwardly onto the guide posts 46. Formed on the lowermost portion of the combination package 70 is a connector portion 77 which is adapted to be removably connected to the landing column 50 in a conventional manner.

Figure 1A:
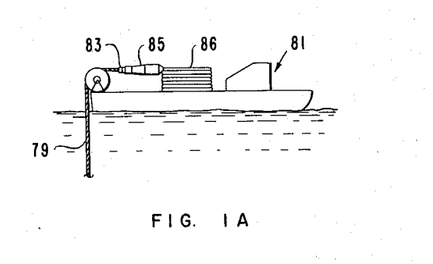
FIGURE 1A is a schematic illustration of a flowline lay barge from which flowline may be pulled down to the underwater installation.

FIGURE 5 illustrates the combination package 70 in operative relation to the production package 54 after it has landed on the landing column 50. As also shown in FIGURE 5, a drawline 79, which may be installed or previously inserted in any manner well known to the art, extends from a location on the barge 32 down through the running string 71 and is further threaded through the combination package 70, finally leading back up through the water to the flowline lay barge 81 shown in FIGURE 1A. At the lay barge 81 the terminal end of the drawline 79 is provided with a special flowline pulling tool 83 which is adapted to be releasably secured inside a specially constructed flowline head 85 formed on the initial length of a supply of flowline 86, as will be described hereinbelow.

Figure 6:
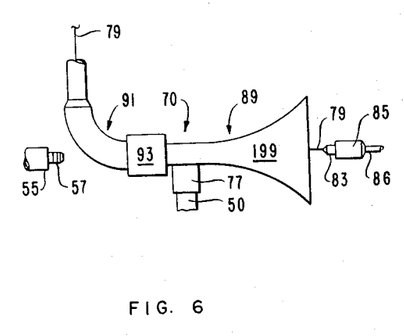
FIGURE 6 is a simplified side elevation showing the initial position of a matable flowline end, carried on the production package, with respect to the combined flowline pulling and alignment package after both said packages have landed on the underwater installation as shown in FIGURE 5.
Figure 7:
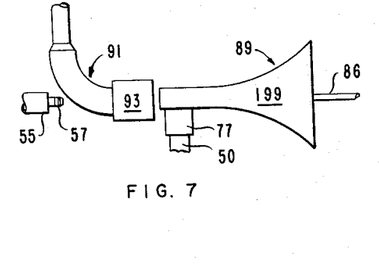
FIGURE 7 is a simplified side elevation, as in FIGURE 6, wherein an ocean floor flowline has been pulled into the alignment means and the flowline pulling means has been moved horizontally out of engagement with said alignment means.
Figure 8:
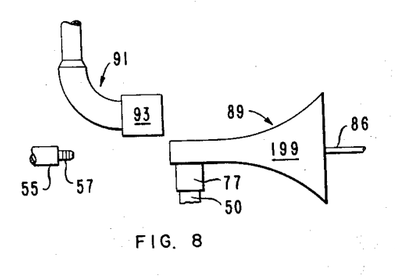
FIGURE 8 is another simplified side elevation, as in FIGURES 6 and 7, wherein said flowline pulling means has been moved vertically out of axial alignment with the end of said alignment means and the matable end of said production package flowline.
Figure 9:
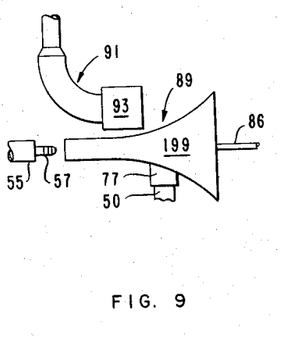
FIGURE 9 is still another simplified side elevation, as in FIGURES 6–8, wherein said alignment means, with the ocean-floor-flowline anchored therein, has been moved horizontally towards the matable end of said production package flowline.
Figure 10:
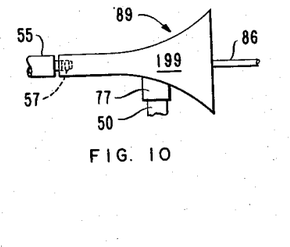
FIGURE 10 is yet another simplified side elevation, as in FIGURES 6–9, wherein the matable end of said production package flowline has been moved horizontally into fluidtight engagement with the oceanfloor flowline carried inside said alignment means.

As best shown in the sequence of simplified FIGURES 6–10, the combination package 70 comprises two basic structures generally denoted at 89 and 91. The structure 89 comprises an alignment means which is slidably mounted upon the connector 77 for horizontal movement and is adapted to receive and anchor the flowline head 85 after a long length of flowline 86 has been pulled from the flowline lay barge 81 down to the ocean floor via the drawline 79. The structure at 91 comprises a flowline pulling means having a connector element 93 integrally formed on one end thereof and adapted to be removably secured to the alignment means 89 as schematically shown in FIGURE 6. In FIGURE 7, the ocean-floor flowline 86 has been pulled inside the alignment means 89 and securely anchored thereto. In addition, the connector element 93 of the flowline pulling means 91 has been released from the alignment means 89 and the entire structure 91 has been moved horizontally out of engagement with the structure 89. FIGURE 8 illustrates the flowline pulling means 91 after it has been moved vertically upwards from its position as shown in FIGURE 7. It should be noted that when the flowline pulling means has been moved to the position shown in FIGURE 8, the horizontal axial path between the matable flowline end 57 of the installation flowline 55 and the alignment means 89 is free of any interfering apparatus. In FIGURE 9 the alignment means 89 with the ocean-floor flowline 86 securely anchored therein, has been moved horizontally to a position adjacent the matable end 57 of the installation flowline 55. FIGURE 10 illustrates the final operation of the sequence wherein the matable end 57 has been moved horizontally into fluidtight engagement with the ocean-floor flowline 86 which is carried inside the alignment means 89.

Figure 11:
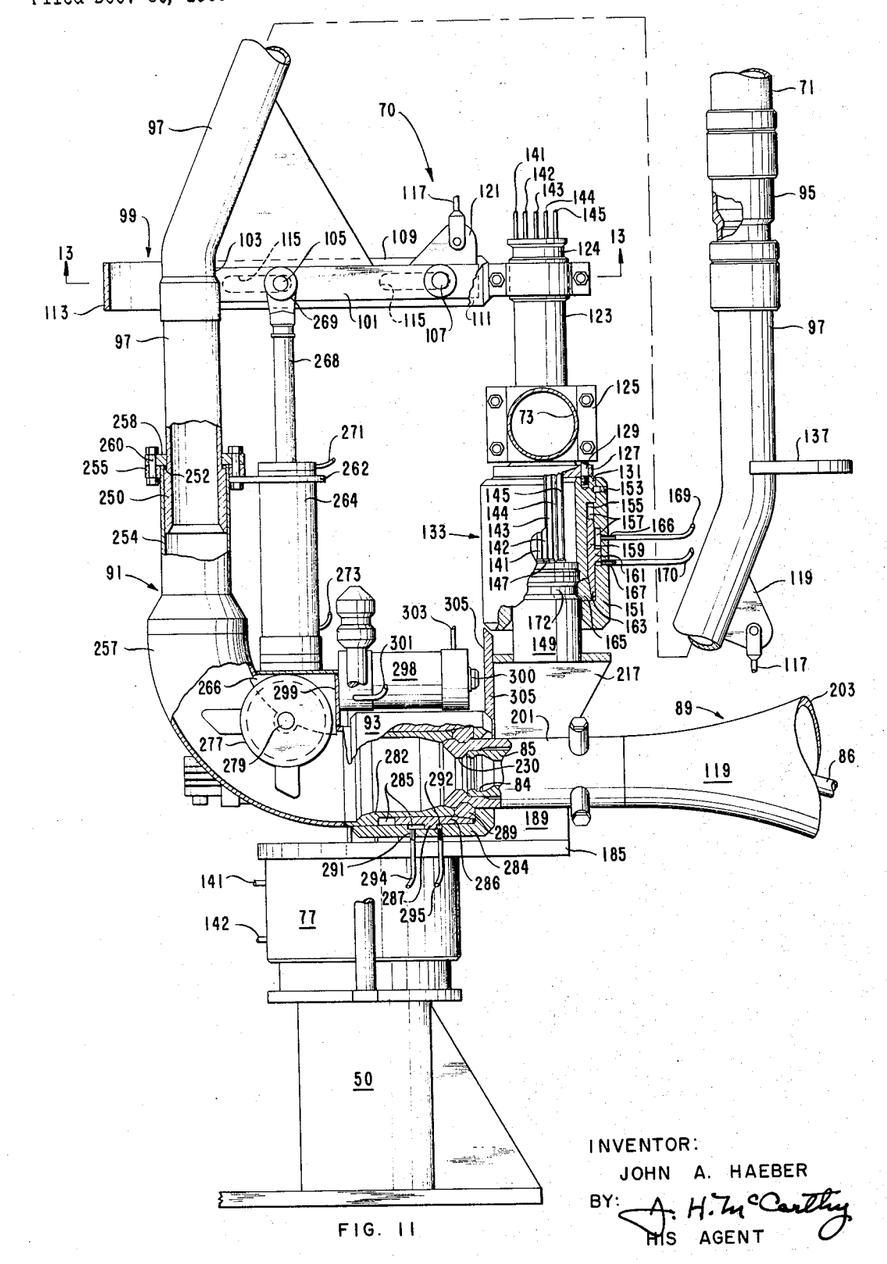
FIGURE 11 is a side elevation in partial cross section of the pipe aligning mechanism of the present invention.
Figure 12:
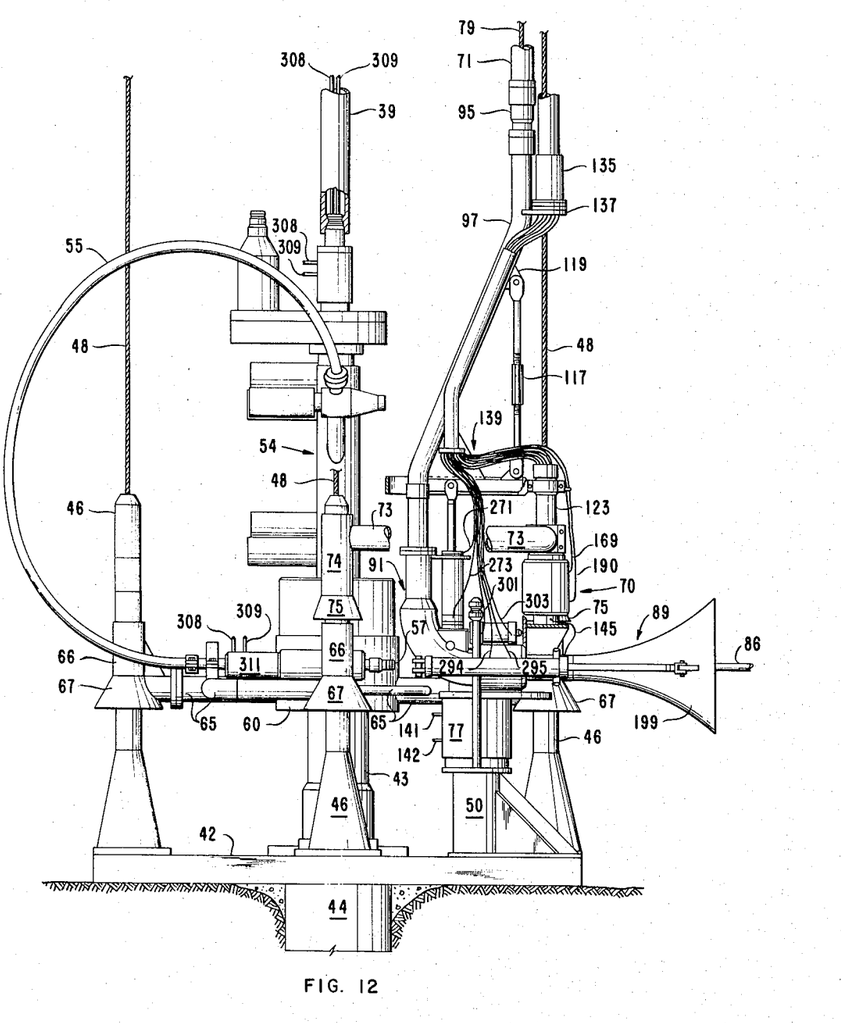
FIGURE 12 is a side elevation of an underwater wellhead equipped with pipe pulling and aligning means in accordance with the present invention.

Referring now to FIGURES 11 and 12 there are shown in detail certain portions of the apparatus after both the production package 54 and the combination flowline pulling and alignment package 70 have landed in their respective positions on the support base 42 and just prior to the sequence of operations briefly described above with reference to FIGURES 6–10. As shown, the lower end of the running string 71 is suitably coupled as by a threaded joint 95 to a cable guide means portion 97 (preferably tubular in shape) of the combination package 70. The cable guide tube 97 extends downwardly and leftwardly to a position where it is received in a yoke-like carriage generally denoted at 99.

As best shown in FIGURE 13, the carriage 99 comprises a bar 101, one end of which is welded or otherwise suitably secured to the lower end of the cable guide tube 97 as shown at 103. The bar 101 is provided with two sets of rods 105 and 107 which extend from each side of the bar and perpendicularly to the longitudinal axis of the bar at preselected spaced apart locations. The carriage 99 further comprises two main frame members 109 and 111 which surround the bar 101 and are joined together, at the end in which the cable guide tube 97 is received, by the U-shaped member 113. As illustrated, the rods 105 and 107 are slidably received in respective longitudinally extending slots 115 formed at spaced locations on each of the frame members 109 and 111. Thus, the cable guide tube 97 and all apparatus connected thereto, both above and below (such as the flowline pulling structure generally denoted at 91 and the running string 71), can be actuated to move a horizontal distance equal to the length of the slots 115. To lend stability to the angularly deflected portion of the cable guide tube 97 a conventional turnbuckle 117 is secured to the guide tube 97 at 119 and to the bar member 101 of the carriage 99 at 121.

Referring to FIGURE 13 in conjunction with FIGURE 11, it is noted that the right-hand ends of the frame members 109 and 111 are clamped together as by bolts 112 to firmly secure the upper end of a tubular shaped guide frame sub 123 therein. The guide frame 73 upon which the entire combination pulling and alignment package 70 is run in place (see FIGURES 3 and 4) is clamped to the sub 123 immediately below the aforementioned juncture of the upper end of the sub with the frame members 109 and 111 of the carriage 99. The lowermost end of the tubular sub 123 is provided with a circumferential flange 127 which is threadably secured as at 129 to a main body member 131 of a sub latching tool generally denoted at 133.

Referring to FIGURE 12 in conjunction with FIGURE 11, it is noted that a second tubular member 135 is attached in parallel relation as by a clamp 137 to both the running string 71 and the cable guide tube 97 attached to the lower end of said running string 71. The tube 135 extends upwardly to the barge 32 and serves as a protective housing for a plurality of fluid lines which are used to actuate a number of hydraulically operable mechanisms which will be described in greater detail infra. As shown in FIGURES 11 and 12, five of the fluid lines 139, namely, lines 141, 142, 143, 144 and 145, are sealingly connected to the upper end 124 of the guide frame sub 123. The said five lines or tubes 141–145 extend downwardly through the hollow sub 123 and thence through the hollow interior of the sub latching tool 133, finally terminating in end portions 147 which are adapted to sealingly stab inside a plurality of bores formed in the upper base of a mandrel 149 which is fixedly secured on top of the alignment means structure 89 of the combination package 70 (see FIGURE 14).

Returning now to the previously mentioned sub latching tool 133 carried on the lower end of the sub 123, it is noted that the main body member 131 thereof is surrounded by a housing member 151 which is secured thereto preferably by threaded members 153. Just below its upper end, the main body member 131 comprises a reduced outer diameter portion 155 which cooperates with the internal surface of the housing 151 to form an annular space 157. A hollow cylindrical sleeve 159 is positioned about the reduced diameter portion 155 of the body member 131 for sliding engagement therewith. An external piston means is formed at 161 by providing the sleeve 159 with an outwardly projecting annular flange. Thus, the sleeve 159 is free to slide in the space 157 defined by the aforementioned surfaces of the body member 131 and the housing 151. The lower end of the slidable sleeve 159 is slightly flared to provide a chamfered actuating surface 163 which is adapted to cooperate with mating chamfered outer surfaces provided on a plurality of horizontally slidable dogs 165, so that downward movement of the sleeve 159 forces the dogs 165 to move radially inwardly to lock an element such as the mandrel 149 securely inside the sub latching tool 133. Fluid ports 166 and 167 are formed through the wall of the housing 151 on both the upper and lower sides of the piston portion 161 of the slidable sleeve 159. The said ports 166 and 167 are suitably coupled to a pair of fluid carrying tubes or lines 169 and 170 which eventually lead back to the barge 32 via the tubular casing 135. By selectively applying fluid pressure through line 169 and port 166 to the upper surface of the external piston means 161 formed on the slidable sleeve 159, the latter will move downwardly and the chamfered actuating surface 163 formed on the lower end thereof will cam the latching dogs 165 into locking engagement with a circumferential groove 172 formed on the outer surface of the mandrel 149. Conversely, by selectively channeling fluid through line 170 and port 167 to the lower surface of the piston means 161, the sleeve will move upwardly, allowing the latching dogs 165 to disengage the mandrel 149.

A detailed description of the alignment means portion 89 of the combination flowline pulling and alignment package 70 will now be given with reference to FIGURE 14 taken in conjunction with FIGURE 11. The entire alignment means 89 is supported by a base plate 185 which is welded or otherwise fixedly secured to the top of the connector 77, which connector is used to removably connect the entire combination package 70 to the landing column 50. Extending upwardly from the sides of the base plate 185 are a pair of heavy side plate members 187 and 189. Suitable structural bracing members 190 are provided to lend support and additional bearing strength to the juncture of the side plates 187 and 189 with the base plate 185.

Figure 14:
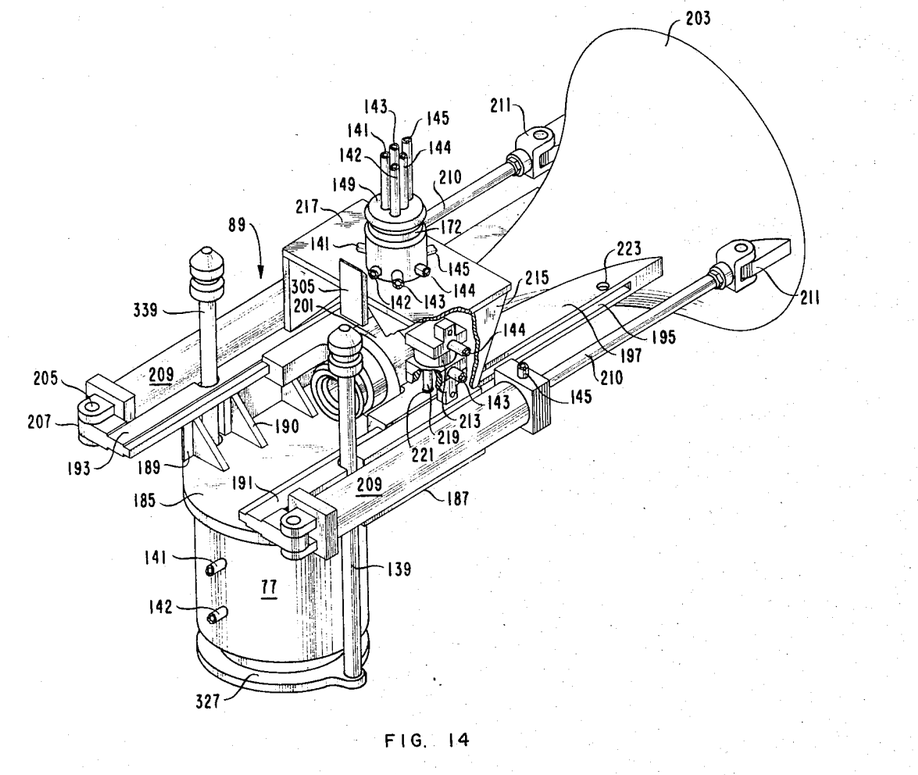
FIGURE 14 is an isometric view of a portion of the movable pipe-aligning means of FIGURE 12.

As best shown in FIG. 14, each side plate 187 and 189 is provided at or near its upper end with a guide rail 191 and 193, respectively. The said guide rails 191 and 193 are adapted to cooperate with longitudinal slots 195 formed on opposite sides of a longitudinally extending slide member 197 which is integrally secured to a tubular alignment horn or element 199 having a head portion 201 and a flared mouth portion 203. The flared mouth portion 203 facilitates easy entrance of an ocean-floor flowline which is to be pulled from the flowline lay barge 81 down to the ocean floor and then inside the alignment horn 199.

Attached to the outermost side of each rail member 191 and 193 as by means of bolts 205 passing through struts 207 is a hydraulically actuatable stroking cylinder 209. Each of the cylinders 209 houses a conventional sliding piston (not shown) to which is connected a piston rod 210. The other end of each of the piston rods 210 is suitably connected as at 211 to the flared mouth portion 203 of the alignment horn 199. In FIGURE 14 the piston rods 210 are shown in fully extended position, such that when fluid pressure is applied through the fluid line or tube 145, which tube extends from the barge 32 down through the mandrel 149 and finally into the cylinder 209, the piston inside the cylinder 209 slides leftwardly and causes the rods 210 to be retracted. Consequently, the alignment horn 199 will slide upon the rails 191 and 193 from the position shown in FIGURE 8 to the position shown in FIGURE 9.

At this juncture it should be noted that a hydraulically operable locking cylinder 213 is bolted to the inside of a side plate 215 formed on one side of an upper box frame 217, which box frame is supported on the rails 191 and 193 and is at all times out of contact with the slide portion 197 of the alignment horn 199. The locking cylinder 213 houses a conventional sliding piston (not shown) which is adapted to be selectively actuated to project and retract a piston rod 219 into either the bore 221 formed at one end of the slide 197, or the bore 223 formed at the other end of the slide 197. Fluid pressure for actuating the sliding piston located inside the locking cylinder 213 is provided via the tubes 143 and 144 which lead through the mandrel 149 secured to the top of the upper box frame 217 to the barge 32. Thus, as will be readily understood, the locking cylinder 213 can be selectively operated to lock the alignment horn 199 either in the extended position shown in FIGURES 8 and 14 or the retracted position shown in FIGURE 9.

Figure 15:
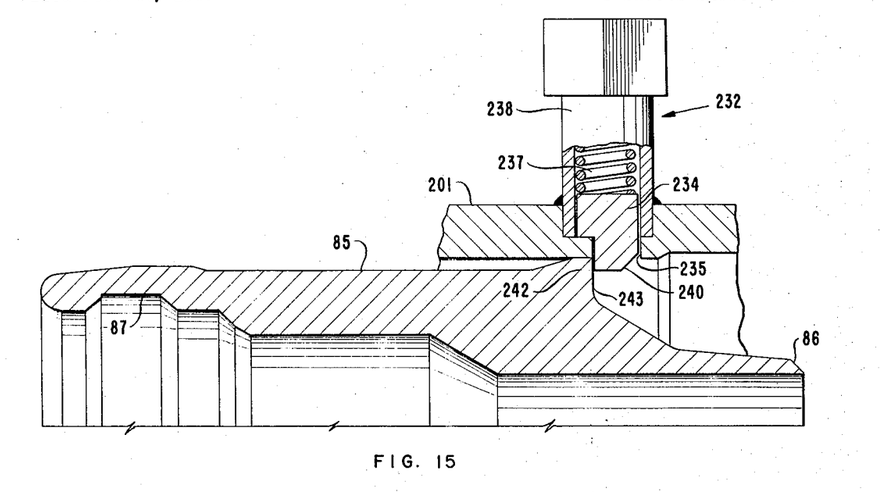
FIGURE 15 is an enlarged detail view taken in cross section of the latching arrangement within the horn head 201 of FIGURE 11.

Reference should now be made to FIGURE 11 in conjunction with FIGURE 15 wherein a detailed description of the manner in which the ocean-floor flowline head 85 is accurately aligned and anchored inside the head portion 201 of the alignment horn or tube 199 will be set forth. As was stated earlier with reference to FIGURE 1A, the ocean-floor flowline head 85 is adapted to internally removably receive a specially constructed flowline pulling tool 83. The specific details of the flowline pulling tool 83 are not the subject of the instant invention and are fully disclosed in my copending application Ser. No. 491,764, filed Sept. 30, 1965. Briefly, however, the tool 83 has a plurality of dogs (not shown) which are adapted to lock inside an internal circumferential groove 87 of the flowline head 85. Thus, when a pulling force is applied to the drawline 79, the flowline head 85 with a long length of trailing flowline 86 is pulled from off the barge 81 down to the ocean floor 45 and towards the flared mouth portion 203 of the alignment horn 199 as shown in FIGURE 6. After the flowline head 85 is pulled inside the alignment horn 199 to the approximate position shown in FIGURE 11, a releasing mechanism (not shown) carried on the tool 83 is actuated by a circumferential, internally protruding shoulder 230 formed on the end of the horn head 201 to release the locking dogs from the groove 87 of the flowline head 85. The drawline 79 and the tool 83 are then retrieved up through the running string 71 and recovered at the barge 32.

As best shown in FIGURE 15, the head portion 201 of the alignment horn 199 is provided with anchoring means shown generally at 232 for fixedly securing the flowline head 85 in an accurately aligned position inside the alignment horn head 201. The anchoring means 232 comprise a plurality of locking dogs 234 (preferably four) which are partially extendible through a countersunk bore 235 formed in the hollow wall of the horn head 201. The dogs 234 are normally urged radially inwardly inside the hollow bores 235 of the horn head 201 by the action of a coil spring 237 which is encased in the housing 238. However, the nose portion of the dogs 234 are provided on their sides nearest the flared mouth portion 203 of the alignment horn 199 with camming surfaces 240. Thus, when the flowline head 85 enters the alignment horn 199 and travels toward the head portion 201 thereof, contact of the said flowline head 85 with the camming surfaces 240 of dogs 234 forces the dogs into a retracted position inside the housing 238 until a circumferential enlarged external shoulder portion 242 of the flowline head 85 has passed by the dogs 234. At this time, the coil spring 237 will urge the dogs downwardly into locking engagement with a flat rear face of the shoulder 242, thereby securely anchoring the flowline head 85 in an aligned position within the horn head 201.

A detailed description of the construction and operation of the flowline pulling means structure 91 of the combination package 70 will now be made with reference to FIGURE 11. As shown, the cable guide tube 97 extends downwardly beyond the carriage 99 finally terminating in an enlarged outer diameter portion 250 having an external circumferential stop shoulder 252 formed thereon. The upper end 254 of a curved, tubular elbow member 257 is slidably received about the enlarged diameter portion 250 in telescopic relation thereto. The uppermost end of the tubular elbow portion 254 is provided with an external, circumferential, integral flange as shown at 255. An annular ring member 258 is slidably received about the cable guide tube 97 and is free to travel in a downward direction until contact is made with the stop shoulder 252 formed on the enlarged diameter portion 250 of the said cable guide tube. The ring member 258 and the flange 255 formed on the upper end 254 of the tubular elbow 257 are fastened together by means of bolts such as shown at 260.

A horizontally extending flange member 262 is fixedly secured to both the upper elbow portion 254 and the housing portion of a hydraulically operable jacking or lifting cylinder 264, which cylinder is supported by a box frame 266 integrally formed on the inner curved portion of the tubular elbow 257. The cylinder 264 houses a slidable piston (not shown) in a conventional manner. A piston rod 268 is connected to the said slidable piston housed in the cylinder 264 and extends upwardly to a location where its terminal end 269 is welded or otherwise suitably secured to the slidable bar 101 of the carriage 99.

Fluid pressure for hydraulically operating the jacking piston 264 between its extended (see FIGURE 11) and retracted positions is respectively provided by the fluid lines or tubes 271 and 273 which lead back to the barge 32 via the casing member 135. Thus, as will be readily understood, after the connector element 93 carried by the terminal end of the elbow portion 257 has been disconnected from the alignment means 89 (see FIGURE 7), the jacking cylinder 264 may be operated to move the entire flowline pulling means 91 vertically upward out of axial alignment with the matable end 57 of the installation flowline 55 and the alignment horn head 201 of the alignment means 89 (see FIGURE 8).

Reverting back to the tubular elbow 257, it is noted that a rotatable cable guide wheel 277 is rotatably mounted inside the curved portion thereof by means of a shaft 279. The rotatable wheel 277 functions to permit easy movement of the drawline 79 through the entire combination package 70 when an ocean-floor flowline 86 is being pulled from the lay barge 81 down to the ocean floor and into said package (see FIGURES 1A and 6).

The connector element 93, which is used to removably connect the entire flowline pulling means 91 to the alignment means 89 is integrally formed on or otherwise secured to the lower terminal end of the curved elbow portion 257. Basically, the flowline pulling connector means 93 is constructed and operates in a fashion identical to that set forth with reference to the previously described sub latching tool 133. Thus, a main body member 282 and an external housing 284 cooperate to define an annular space 285 which slidably receives a cylindrical sleeve 286 having an external piston means formed at 287. The right-hand end of the slidable sleeve 286 is slightly flared to provide a chamfered actuating surface which is adapted to cooperate with mating chamfered outer surfaces provided on a plurality of vertically slidable dogs 289 so that rightward movement of the sleeve 286 forces the dogs 289 to move radially inwardly to lock an element such as the alignment horn head 201 (provided with an external circumferential locking groove) securely inside the flowline pulling connector element 93.

Fluid ports 291 and 292 are formed through the wall of the housing 284 on both the left- and right-hand sides of the piston portion 287 of the slidable sleeve 286. The said ports 291 and 292 are suitably coupled to a pair of fluid carrying tubes or lines 294 and 295 which eventually lead back to the barge 32 via the tubular casing 135. By selectively applying fluid pressure through line 294 and port 291 to the left-hand surface of the external piston 287 formed on the slidable sleeve 286, the latter will move rightwardly and the chamfered actuating surface formed on the right-hand terminal end thereof will cam the latching dogs 289 into locking engagement with the circumferential groove formed on the outer surface of the alignment horn head 201. Conversely, by selectively channeling fluid through line 295 and port 292 to the right-hand surface of the piston means 287, the sleeve 286 will move leftwardly, allowing the latching dogs 289 to disengage the alignment horn head 201.

Still referring to FIGURE 11, a hydraulically operable kick-off cylinder 298 is welded or otherwise suitably secured to a side plate 299 of the box frame 266 which is mounted on the elbow portion 257. A conventional slidable piston (not shown) is received inside the kick-off cylinder 298 and has a piston rod 300 connected thereto. Fluid pressure for hydraulically operating the piston rod 300 of the kick-off cylinder 298 between its extended and retracted (see FIGURE 11) positions is respectively provided by the fluid lines or tubes 301 and 303 which lead back to the barge 32 via the casing member 135. As shown in both FIGURES 11 and 14, the upper box frame 217 of the alignment means 89 is provided on its front or left-hand side with a vertically extending reaction plate 305 against which the piston 300 may react when it is hydraulically forced to an extended position. Thus, as will be readily understood, after the connector element 93 carried by the terminal end of the elbow portion 257 has been disconnected from the alignment means 89, the kick-off cylinder 298 may be operated to extend the piston rod 300 into engagement with the reaction plate which results in horizontal movement of the cylinder 298 thereby causing the entire flowline pulling means 91 to move horizontally out of engagement with the alignment horn head 201 of the alignment means 89 (see FIGURE 7).

The actual operational sequence of the various mechanisms carried on the combination pulling and alignment package 70 will now be described to clearly illustrate the manner in which the operations shown in the simplified FIGURES 6–8 are carried out. At the barge 32 fluid pressure is applied through line 295 to move the sleeve 287 leftwardly thereby releasing the locking dogs 289 of the flowline pulling means connector element 93 for radial outward travel. Fluid pressure is then applied through the line 301 to force the piston rod 300 of the kick-off cylinder 298 to an extended position where it reacts against the reaction plate 305 and thereby forces the entire flowline pulling means 91 leftwardly out of engagement with the alignment means 89 as shown in FIGURE 7. At this juncture it should be noted that the cable guide tube 97 and the entire running string 71 will move horizontally to the left a distance equal to the length of the slots 115 formed on the frame members 109 and 111 of the carriage 99. Thereafter, fluid pressure will be transmitted through the line 271 to the upper end of the jacking or lifting cylinder 264 which causes the said lifting cylinder and the telescopically received portion 254 of the tubular elbow 257 to be retracted or moved upwardly towards the carriage 99. Thus, as shown in FIGURE 8, the entire flowline pulling means 91 of the combination package 70 has been disengaged from the alignment means 89 and moved vertically out of axial alignment with the matable flowline end 57 of the installation flowline 55 and the alignment horn head 201 which carries the ocean-floor flowline head 85 therein.

The procedure continues with the application of fluid pressure through line 143 which causes the piston rod 219 of the locking cylinder 213 to move upwardly out of engagement with the hole 221 formed in the front end of the slide 197 (see FIGURE 14). The next step in the operation involves the application of fluid pressure through the line 145 to stroke the piston rod 210 of the alignment horn stroking cylinder 209 horizontally to the left to its retracted position (see FIGURES 9 and 14). Fluid pressure is then applied through the line 144 to cause the piston rod 219 of the locking cylinder 213 to engage the hole 223, formed in the rear portion of the slide 197, and thereby firmly secure the alignment horn 199 in its retracted position.

At this point it should be noted that it is entirely within the scope of the invention to make the horizontal connection between the matable installation flowline end 57 and the ocean-floor flowline alignment horn 199 (see FIG-URES 8–10) in a variety of ways. For example, the alignment horn 199 may be stroked the entire horizontal distance to the matable installation flowline end 57 without ever moving the latter from its position shown in FIGURES 8 and 12. Conversely, after the operation has proceeded to the point shown in FIGURE 8, the matable flowline end 57 of the installation flowline 55 could be telescopically extended into fluidtight engagement with the ocean-floor flowline head 85 carried in the alignment means 89 without any movement whatsoever of the alignment horn 199. However, it has been found preferable to move both the alignment horn 199 and the matable flowline end 57 horizontally towards each other in the sequence of operations previously described with reference to FIGURES 9 and 10.

In any event, and proceeding with the preferable mode of operation (FIGURES 9 and 10), after the alignment horn 199 has been stroked or retracted leftwardly to the position shown in FIGURE 9, fluid pressure is then applied through line 170 (see FIGURE 11) to drive the sleeve 159 upwardly and thereby free the latching dogs 165 of the sub latching tool 133 for radial outward movement. A pulling force is then applied to the running string 71 at the barge 32 to remove the entire flowline pulling structure 91, including the guide frame 73, off of the mandrel 149 (carried by the alignment means 89) for recovery at the barge 32. Thus, only the alignment means portion 89 of the combination package 70 remains secured to the support base 42 as best shown in the right-hand portion of FIGURE 16.

Figure 16:
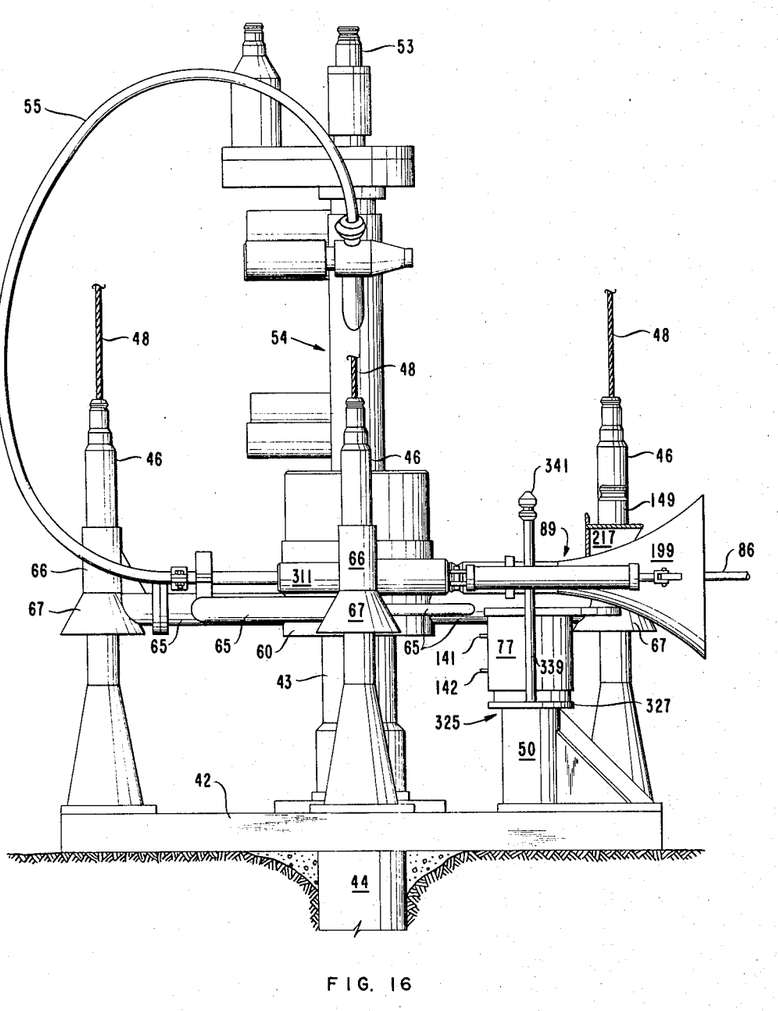
FIGURE 16 is a side elevation of the underwater wellhead apparatus of FIGURE 12 with the flowlines connected.

With the alignment horn 199 of the alignment means 89 in its retracted position as shown in FIGURES 9 and 16, and the matable flowline end 57 of the installation flowline 55 in the non-extended position as shown in FIGURES 9 and 12, the final operation of extending the matable installation flowline end 57 into fluidtight engagement inside the ocean-floor flowline head 85 (carried inside the alignment horn head 201) takes place as follows. As shown in FIGURE 12, the running string 39 is either still connected to the nipple or mandrel 53 situated atop the production package 54 or, in the alternative, is reconnected thereto in a conventional manner. Located inside the hollow running string 39 and extending from the barge 32 down into fluidtight engagement with the top of the nipple 53 are two fluid-carrying tubes or lines 308 and 309. The tubes 308 and 309 continue through passageways (not shown) in the nipple 53 and reissue from the side thereof as illustrated. Tubes 308 and 309 terminate in the housing wall of a telescopically extendible tool 311.

The specific details of the tool 311 are not the subject of the instant invention since such tools are of relatively conventional design and any tool capable of extending the matable end 57 of the installation flowline 55 into fluidtight engagement with the ocean-floor flowline head 85, carried inside the alignment means 89, may be utilized. For example, a particularly suitable tool for such an extending operation is shown in U.S. Patent 3,090,437, issued to R. L. Geer. Thus, it will be understood that when fluid pressure is applied through the tubing 308 the tool 311 will be actuated to extend the matable flowline end 57 of the installation flowline 55 into fluidtight engagement with the ocean-floor flowline 85 carried inside the alignment means 89 as shown in FIGURES 10 and 16. After the ocean-floor flowline 86 has been installed on the underwater installation comprising the production package 54 and the attendant well casing-head apparatus, the entire underwater structure is ready for the production of fluids from the well 44 as best shown in FIGURE 16.

Figure 17:
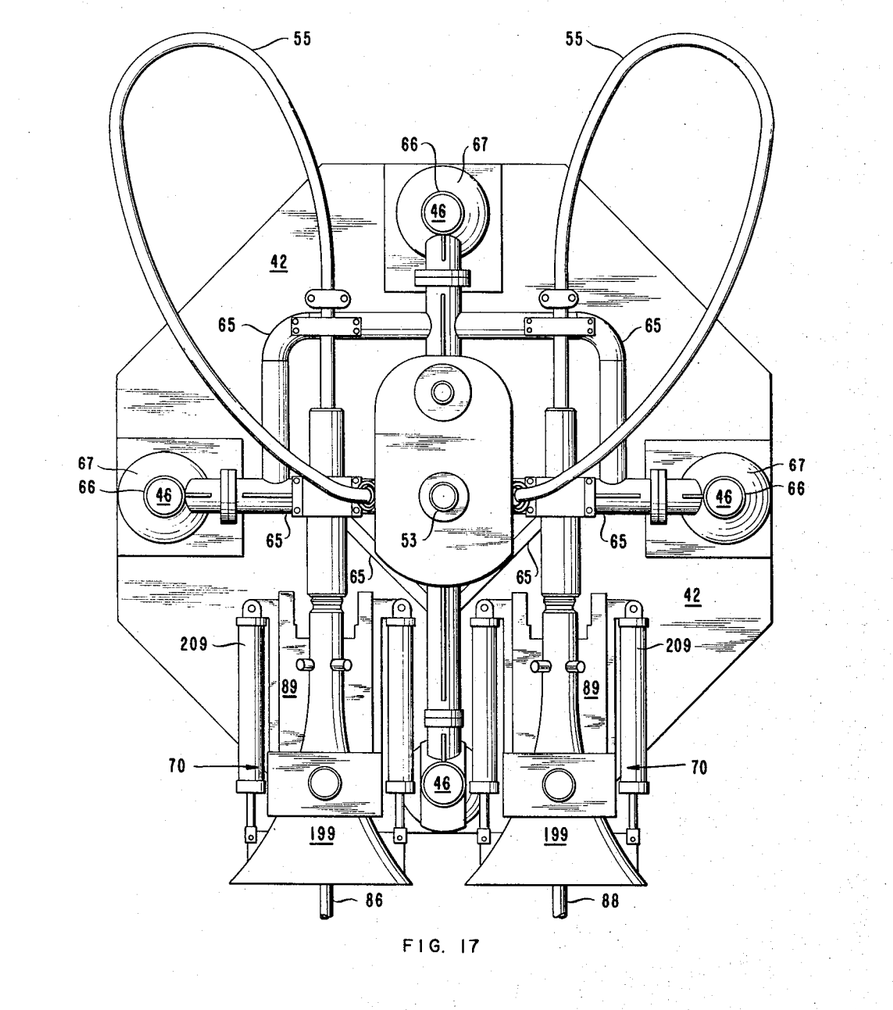
FIGURE 17 is a plan view of the apparatus of FIGURE 16.

As was stated earlier, in order to simplify the description of the invention, reference has only been made to an operation wherein an ocean-floor flowline has been installed on the left-hand side of the installation with the matable end 57 of the installation flowline 55. However, it should be borne in mind that all these operations could be carried out in duplicate on the right-hand side of the installation to install an ocean-floor flowline in fluidtight relation with the matable end 58 of the installation flowline 56. For clarity of this aspect of the invention, the plan view of FIGURE 17 has been provided to illustrate the entire underwater installation after ocean-floor flowlines 86 and 88 have been respectively installed on both the left and right-hand sides thereof.

If during the life of the well it is necessary to remove either the production package 54 or the alignment means 89 which receive the ocean-floor flowline 86, fluid pressure may be applied through the tubing 309 to cause the tool 311 to retract the matable end 57 of the installation flowline to the position shown in FIGURE 12. Thus, either the production package 54 or the alignment means 89 may be independently recovered at the barge 32.

Figure 18:
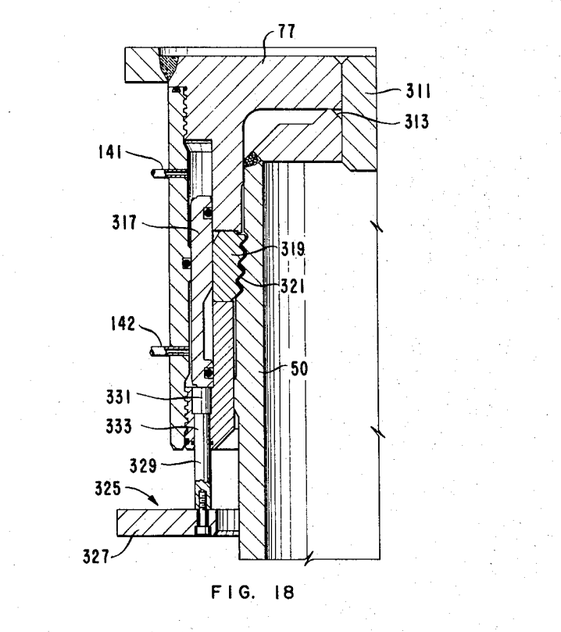
FIGURE 18 is a detailed cross-sectional view of the connector 77 of FIGURES 11 and 12.

One other aspect of the invention is shown in FIGURE 18 when taken in conjunction with FIGURE 16. In FIGURE 18 the connector portion 77 formed on the bottom of the alignment means 89 is shown after it has been removably secured to the landing column 50. To aid in the initial seating operation of the connector portion 77 on the landing column 50 a preferably rectangular alignment pin 311 extends downwardly from the connector 77 to cooperate with a beveled bore 313 formed in the upper surface of the column 50. Thereafter, fluid pressure is applied through the line 141 (see FIGURES 14 and 18) thereby forcing the piston 317 downwardly to the position shown in FIGURE 18. The said movement of the piston 317 forces a plurality of latching dogs 319, carried circumferentially about the interior body of the connector 77, into locking engagement with circumferential grooves 321 formed on the exterior of the landing column 50.

If it should later be desired to unlatch the connector 77 from the landing column 50 for recovery of the alignment means 89 (see FIGURE 16), fluid pressure may be applied through the line 142 to force the piston 317 upwardly thereby allowing the locking dogs 319 to move radially outwardly from engagement with the grooves 321 of the landing column 50. However, experience has shown that after long periods of non-use the fluid lines 141 and 142 may become fouled with marine life, etc. It has also been found that the piston 317 can become "frozen" in its lower position after long periods of deactivation.

In order to insure that the alignment means 89 may be recovered at the water surface, in spite of the aforementioned contingencies, a mechanical unlatching mechanism has been provided on the connector element 77. This mechanical unlatching mechanism is shown generally at 325 in FIGURES 16 and 18 and comprises, inter alia, an annular ring adapted to slide vertically about the landing column 50. A plurality of piston rods 329 are secured at circumferentially spaced locations about the upper side of the annular ring 327. The piston rods 329 are provided with enlarged heads 331 which normally seat in bores 333 formed in the lower surface of the connector 77, thereby limiting downward travel of the ring 327 as shown in FIGURE 18. The upper surfaces of the enlarged piston rod heads 331 are adapted to contact the lower surface of the annular piston 317 carried inside the connector 77.

Two pulling rods 339 extend upwardly from the top of the ring 327 on opposite sides thereof as best shown in FIGURES 14 and 16. The pulling rods 339 terminate in enlarged fishing heads 341 located above the entire alignment means 89 where they are readily accessible to a conventional fishing tool (not shown) which is adapted to be secured thereto. Such a fishing tool may be readily lowered on a guide frame, similar to the previously described frame 73, via the guide cables 48 and the guide posts 46.

Thus, if for any reason the piston 317 should become fouled in its lower position, as shown in FIGURE 18, a pulling force may be exerted on the pull rods 339 thereby causing the ring 327 and the piston rods 329 attached thereto to move upwardly to force the piston 317 to be removed from behind the dogs 319 so that the entire alignment means 89 may be recovered at the barge 32.

I claim as my invention:

1. Apparatus for use at an underwater installation for installing a flowline at said installation, said apparatus comprising:
   (a) flowline anchoring means securable to said installation, said anchoring means including a receiver portion for receiving a flowline from a predetermined direction;
   (b) alignment means operatively securable to said installation, said alignment means having an alignment axis arranged substantially in the same axis as said receiver portion of said anchoring means;
   (c) flowline pulling means adapted to be operatively secured to said installation, said flowline pulling means including a detachable flowline connector carried at the end of a cable and adapted to be secured to the end of a flowline, and cable guide means in which said cable is adapted to move; one end of said cable guide means being normally operatively positioned adjacent said anchoring means and in substantially the same axis as the receiver portion thereof; and,
   (d) mover means operatively engageable with said flowline pulling means for moving said flowline pulling means out of axial alignment with the axis of said receiver portion of said anchoring means.

2. Apparatus as set forth in claim 1 wherein said flowline anchoring means includes remotely operable means for removably securing said anchoring means to said installation.

3. Apparatus as set forth in in claim 1, said apparatus further including an ocean-floor flowline passing through said alignment means and secured to said receiver portion of said anchoring means.

4. Apparatus as set forth in claim 3, said apparatus further including an installation flowline normally secured to said installation, the end of said installation flowline being arranged in spaced axial alignment with said receiver portion of said anchoring means.

5. Apparatus as set forth in claim 4 including connector means carried by one end of one of said flowlines and adapted to extend said flowline end into sealed, fluidtight relation with the end of said other flowline.

6. Apparatus as set forth in claim 5 wherein means are provided for extending both of said flowline ends toward and into sealed, fluidtight relation with each other.

7. Apparatus as set forth in claim 1 wherein said receiver portion of said anchoring means is adapted to receive a flowline in a substantially horizontal plane; and, said alignment means and the cable guide means of said flowline pulling means are located on opposite sides of the receiver portion of said anchoring means.

8. Apparatus as set forth in claim 7 wherein the cable guide means of said flowline pulling means includes conduit means having a first portion which is normally operatively positioned in the same horizontal plane as the receiver portion of said anchoring means.

9. Apparatus as set forth in claim 8 wherein the cable guide means of said flowline pulling means includes a second conduit portion operatively associated with said first conduit portion of said first cable guide means and which extends from a horizontal position to a vertical position terminating near the water surface.

10. Apparatus as set forth in claim 1 wherein prime mover means are operatively associated with the cable guide means of said flowline pulling means for moving said cable guide means out of axial alignment with the receiver portion of said anchoring means.

11. Apparatus as set forth in claim 10 wherein said prime mover means includes first and second prime movers for respectively moving said cable guide means both laterally away from and longitudinally out of alignment with the receiver portion of said anchoring means.

12. Apparatus as set forth in claim 1 wherein said alignment means is operatively secured to said anchoring means and the alignment axis of said alignment means is arranged in a substantially horizontal direction.

13. Apparatus as set forth in claim 1 including a casinghead extending from a position above said installation down through said installation into a well on the ocean floor, said casinghead being positioned in the vicinity of said flowline anchoring means.

14. Apparatus as set forth in claim 13 wherein a pair of both said anchoring and said alignment means are arranged on opposite sides of said casinghead and parallel to a line normal to the axis of said casinghead.

15. Apparatus as set forth in claim 13 including a production wellhead assembly lowerable through the water into operative engagement with said casinghead, said production wellhead having a flowline extending therefrom, the end of said wellhead flowline being positioned in spaced axial alignment with said receiver portion of said anchoring means of said installation.

16. Apparatus as set forth in claim 15 including an ocean-floor flowline passing through said alignment means and secured to said receiver portion of said anchoring means.

17. Apparatus as set forth in claim 16 including connector means carried by one end of one of said flowlines and adapted to extend said flowline end into sealed, fluidtight relation with the end of said other flowline.

18. Apparatus to facilitate the remote joining of a flowline to an underwater installation comprising:
    (a) an underwater installation near the ocean floor having a substantially rigid fluid flowline extending therefrom, said installation flowline having a matable end;
    (b) a substantially rigid ocean-floor flowline having a matable end for engagement with the matable end of said installation flowline;
    (c) flowline pulling means for pulling said ocean-floor flowline toward said installation flowline;
    (d) alignment means adapted to cooperate with both said installation and said flowline pulling means for axially aligning in spaced apart relation and in a substantially horizontal direction, the matable end of said ocean-floor flowline with the matable end of said installation flowline;
    (e) flowline anchoring means, including a receiver portion, for anchoring said ocean-floor flowline in said aligned position;
    (f) means for removing apparatus from a position between said axially aligned flowline end; and,
    (g) connector means carried by one matable end of one of said flowlines, said connector means being adapted to extend said flowline end into sealed, fluidtight engagement with the matable end of said other flowline.

19. Apparatus as set forth in claim 18 wherein said alignment means is operatively secured to said receiver portion of said anchoring means and wherein said alignment means includes a tubular member having a flared mouth portion opposite the end at which it is secured to said anchoring means.

20. A method of remotely connecting a flowline with an installation submerged in a body of water, said installation having a matable fluid flowline extending therefrom, said method comprising:
    (a) providing the installation with flowline alignment means;
    (b) arranging flowline pulling means, including a flexible portion and a guide therefor, in operative association with said flowline alignment means;

(c) securing one end of said flexible portion of said flowline pulling means to an ocean-floor flowline having a cooperable matable end adapted to be coupled to said matable end of said installation flowline;

(d) applying tension to the flexible portion of said flowline pulling means to pull said ocean-floor flowline to and into contact with said alignment means;

(e) anchoring the end of said ocean-floor flowline in axial alignment with, and at a spaced distance from, the matable end of said installation flowline;

(f) clearing the space between the axially aligned ends of said flowlines of any interfering apparatus; and, (g) extending at least one of said matable flowline ends into sealed, fluidtight engagement with said other matable flowline end.

21. The method of claim 20 wherein said step of extending said flowline ends into engagement with each other includes moving both of the matable ends towards each other.

References Cited

UNITED STATES PATENTS

| | | | |
|---|---|---|---|
| 3,233,667 | 2/1966 | Van Winkle | 166—.6 |
| 3,260,270 | 7/1966 | Watkins | 166—.5 X |
| 3,307,627 | 3/1967 | Shatto | 166—.6 |
| 3,308,881 | 3/1967 | Chan et al. | 166—.6 |

CHARLES E. O'CONNELL, *Primary Examiner.*

RICHARD E. FAVREAU, *Assistant Examiner.*